(12) United States Patent
Bishtein et al.

(10) Patent No.: US 9,748,783 B2
(45) Date of Patent: Aug. 29, 2017

(54) SMART VOLTAGE DEDICATED CHARGER SYSTEM

(71) Applicant: BROADCOM CORPORATION, Irvine, CA (US)

(72) Inventors: Vadim Bishtein, Sunnyvale, CA (US); Lionel Maurice Federspiel, Laguna Niguel, CA (US); Walid Nabhane, Long Valley, NJ (US); Christopher Adrain Den Haan, Burnaby (CA)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 178 days.

(21) Appl. No.: 14/728,955

(22) Filed: Jun. 2, 2015

(65) Prior Publication Data

US 2015/0349563 A1   Dec. 3, 2015

Related U.S. Application Data

(60) Provisional application No. 62/158,468, filed on May 7, 2015, provisional application No. 62/006,772, filed on Jun. 2, 2014.

(51) Int. Cl.
*H01M 10/44* (2006.01)
*H01M 10/46* (2006.01)
*H02J 7/00* (2006.01)
*H02J 7/04* (2006.01)

(52) U.S. Cl.
CPC .............. *H02J 7/0052* (2013.01); *H02J 7/04* (2013.01); *H02J 2007/0059* (2013.01); *H02J 2007/0062* (2013.01); *H02J 2007/0098* (2013.01)

(58) Field of Classification Search
CPC ......... H02J 2007/0062; H02J 2007/006; H02J 7/007; H02J 7/0021
USPC .................................. 320/107, 111, 114, 128
See application file for complete search history.

(56) References Cited

U.S. PATENT DOCUMENTS

| | | | | |
|---|---|---|---|---|
| 2007/0236169 A1* | 10/2007 | Purdy | ................... | H02J 7/0052 320/106 |
| 2010/0219790 A1* | 9/2010 | Chadbourne | ........... | G06F 1/266 320/107 |
| 2012/0119696 A1* | 5/2012 | Picard | ................... | H01M 10/48 320/107 |
| 2014/0245030 A1* | 8/2014 | Helfrich | .................. | H02M 7/04 713/300 |
| 2015/0318728 A1* | 11/2015 | Ghosh | ................. | G06F 13/4282 320/107 |

* cited by examiner

*Primary Examiner* — Edward Tso
(74) *Attorney, Agent, or Firm* — McDermott Will & Emery LLP

(57) ABSTRACT

A voltage dedicated charger apparatus includes an AC-to-DC converter circuit, a pair of switches, and a controller block. The AC-to-DC converter circuit converts an AC input voltage to a DC output voltage. The pair of switches is operable to isolate a pair of data ports from the AC-to-DC converter circuit. The pair of data ports includes a DP port and a DN port. The controller block includes a monitor circuit, a transceiver, and a control circuit. The monitor circuit monitors the DP and DN ports of the apparatus. The transceiver receives one or more messages form a charge-receiving device and communicate data to the charge-receiving device. The control circuit controls operation of the pair of switches based on a signal from the monitor circuit.

20 Claims, 7 Drawing Sheets

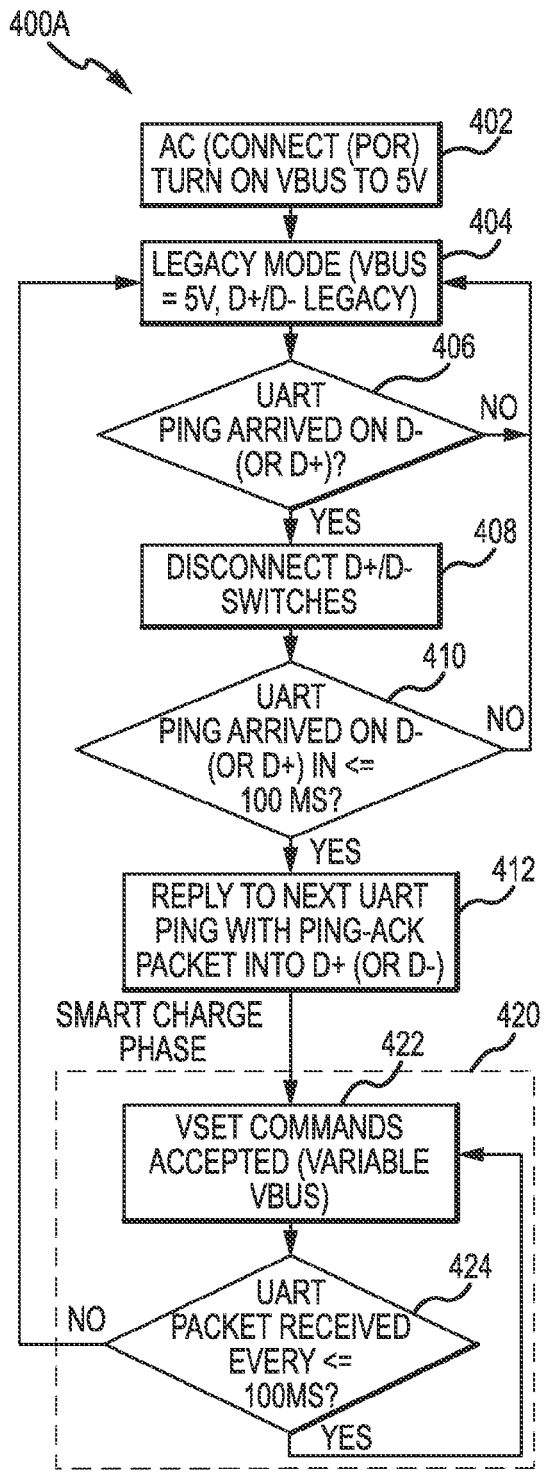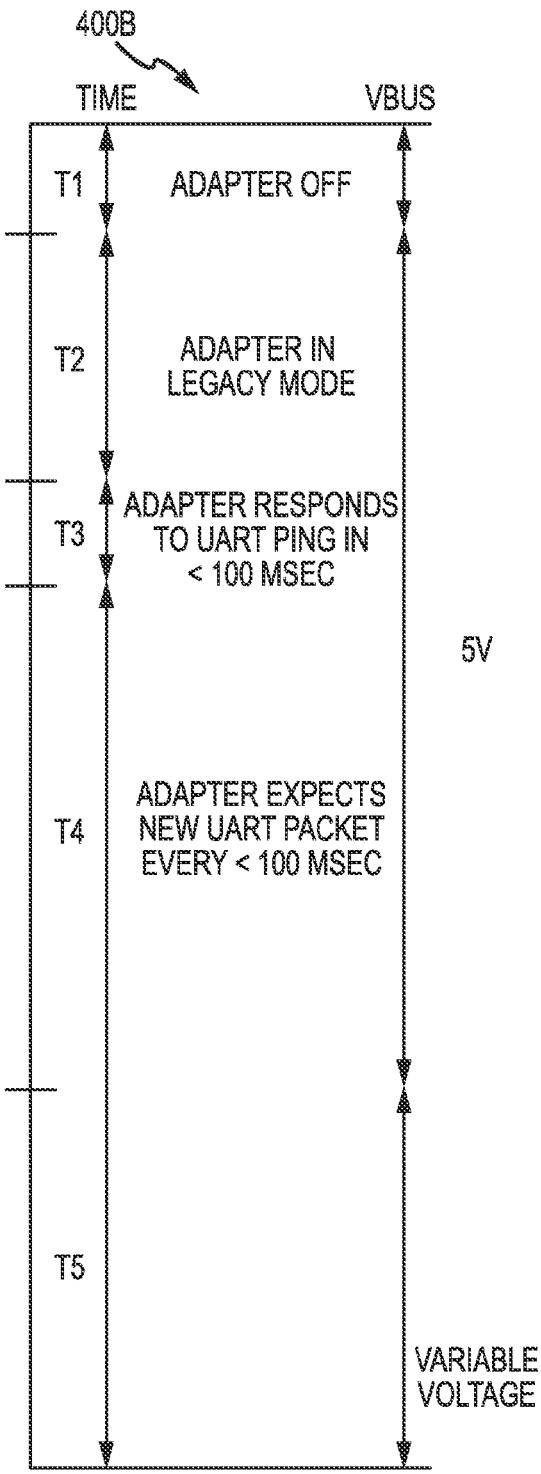
FIG.4A
FIG.4B

SMART VOLTAGE DEDICATED CHARGER SYSTEM

CROSS-REFERENCE TO RELATED APPLICATIONS

This application claims the benefit of priority under 35 U.S.C. §119 from U.S. Provisional Patent Application 62/006,772 filed Jun. 2, 2014, and 62/158,468 filed May 7, 2015, which are incorporated herein by reference in their entirety.

TECHNICAL FIELD

The subject technology generally relates to integrated circuits and, in particular, relates to smart voltage dedicated charger system.

BACKGROUND

Wireless communication devices such as cellular phones and tablets can be charged from an electrical power outlet. There are a number of issues relating to charging these devices, for example, the battery charging time can be lengthy and charging current for large size batteries (e.g., above 3-4 AH), which require more power, exceeds maximum rated current (e.g., 2 A) through a connection cable. Existing chargers do not allow the communication device operation without the battery being connected or without depleting battery charge while using the communication device with heavy load use cases. Further, charging efficiency is not optimized, which can result in undesired heat generation while charging the device.

A charger apparatus is also desired to allow linear charging by tracking battery voltage. While universal serial bus (USB) standard specifies charger type and method of recognition through reading voltage/impedance on USB D+/D− pins, original equipment manufacturers (OEMs) tend to add new resistance identification (RID) value and/or method of detection. For example, some vendor's adapters use battery charging detection scheme based on sensing and measuring USB D+/D− pins using analog or digital comparators for every charger type. USB standard has developed USB power delivery (PD), but its implementation can be costly for applications such as phone applications.

BRIEF DESCRIPTION OF THE DRAWINGS

Certain features of the subject technology are set forth in the appended claims. However, for purpose of explanation, several embodiments of the subject technology are set forth in the following figures.

FIGS. 4A-4B are a flow diagram and a corresponding time diagram illustrating an example of an operation of a smart voltage dedicated charger apparatus in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In one or more aspects of the subject technology, methods and configurations are described for delivering a higher power-level to an electronic device such as a mobile communication device (e.g., a cellular phone, a tablet, etc., hereinafter "device"). The subject technology can use D+/D− terminals of a universal serial bus (USB) connector to enable communication (e.g., half duplex communication) between the device and a USB charger apparatus (hereinafter "charger"). In some aspects, the half-duplex communication includes a digital communication channel, which replaces the analog voltage level used in the existing solutions. The subject technology includes a number of advantageous features. For example, the disclosed solution enables charging time reduction and supports large size battery (e.g., >3-4 Ah) by delivering more power without increasing maximum rated current (e.g., ~2 A) through the cable. The disclosed solution allows heavy load use case without battery depletion, for instance, the device can be operated without the battery being connected or without depleting battery charge while using the device with heavy load use cases. Further, the subject technology optimizes charge efficiency to reduce heat related issues, and supports linear charging method by tracking battery voltage.

Figure 1:
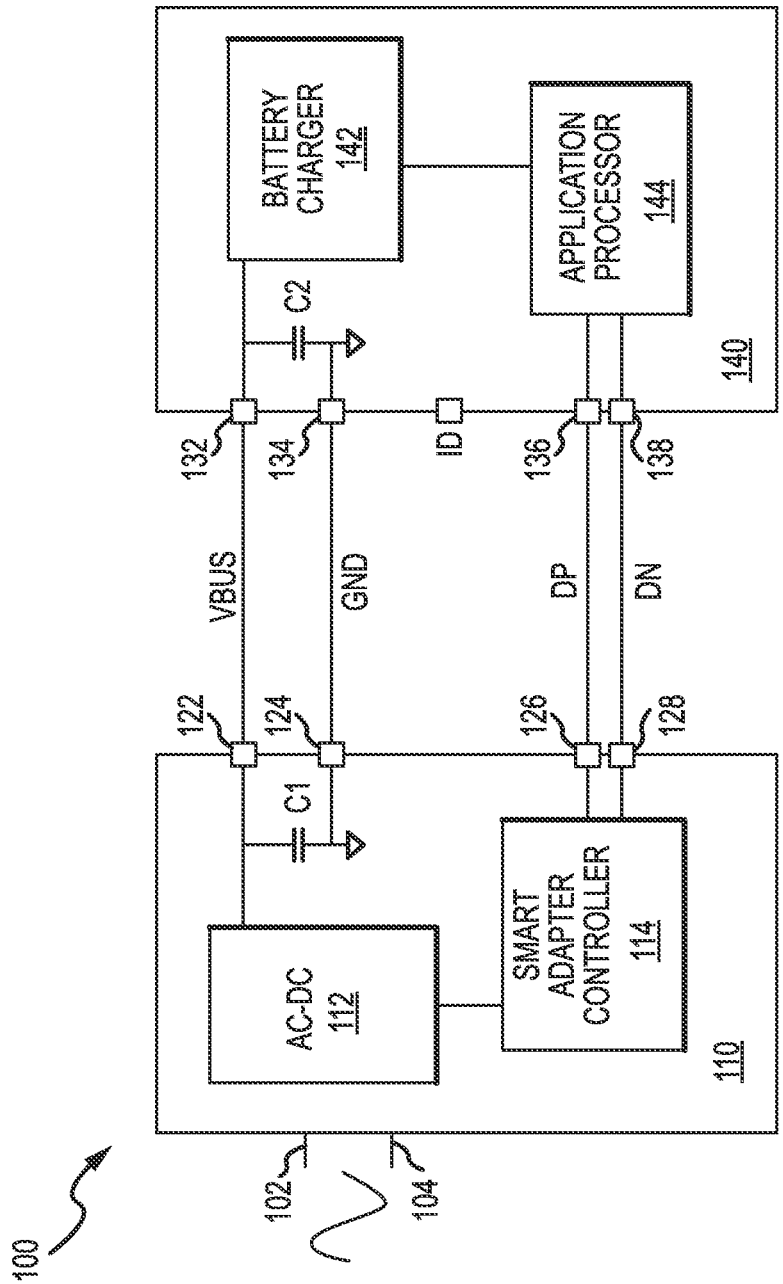
FIG. 1 illustrates an example of a smart voltage dedicated charger system in accordance with one or more implementations.

FIG. 1 illustrates an example of a smart voltage dedicated charger system 100 in accordance with one or more implementations of the subject technology. The smart voltage dedicated charger system 100 includes a charger 110 and a charge-receiving device (hereinafter "device") 140 coupled through a USB cable. The charger 110 receives AC voltage (e.g., 110V or 220V) at ports 102 and 104, when these ports are connected to AC line, and provides a fixed DC output voltage (e.g. ~5V) or a variable DC output voltage (e.g., between 5V and 20V) at ports 122 and 124 connected, respectively, to terminals VBUS and GND of the USB cable. The charger 110 includes, among other circuitry, an AC-DC converter circuit 112 and a smart adaptor controller 114. The AC-DC converter circuit 112 converts the AC voltage received at the ports 102 and 104 to the DC output voltage which after filtration by capacitor C1 is delivered to ports 122 and 124 of the charger 110. The smart adaptor controller 114 monitors DP (D$^+$) and DN (D$^-$) terminals of the USB cable through ports 126 and 128 and controls the DC output voltage of the AC-DC converter circuit 112 and the appearance of the DP and DN terminals to the device 140, as will be discussed in more details herein.

The device 140 includes, but is not limited to, a battery charger 142 and an application processor 144. The battery charger 142 receives DC input voltage from ports 132 and 134, which are connected to a capacitor C2 and become connected, respectively, to the terminals VBUS and GND of the USB cable, when the device is connected to the USB cable. The battery charger 142 includes known circuitry and is capable of using the DC input voltage to provide a required level of voltage and current for charging one or more batteries of the device 140. The Application processor 144 is coupled to ports 136 and 138, which become connected, respectively, to the DP and DN terminals of the USB cable. The application processor 144 is responsible, among other things, for handling communication (e.g., digital communication) between the battery charger 142 and the smart adaptor controller 114.

Figure 2A:
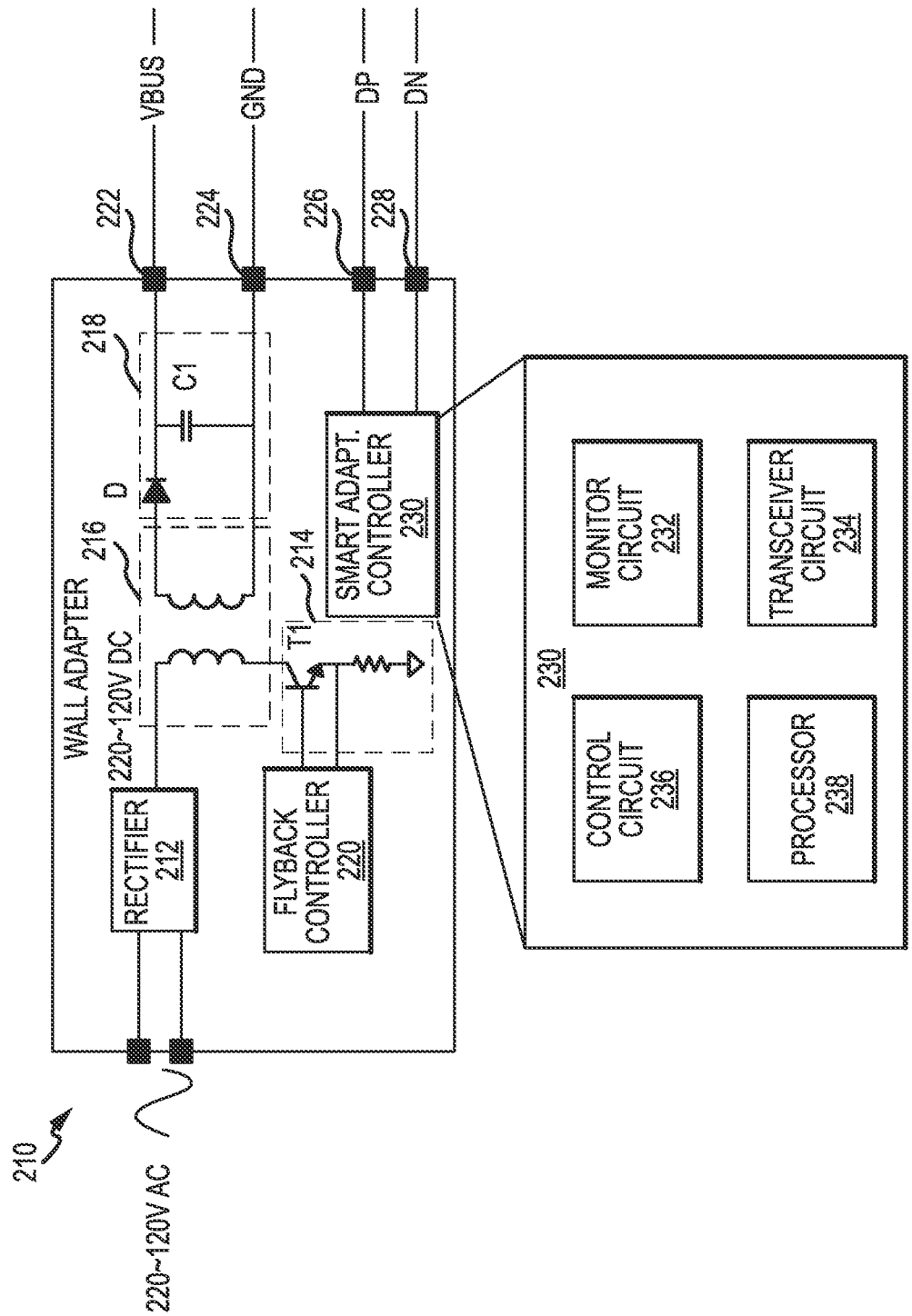
FIGS. 2A-2B illustrate examples of a smart voltage dedicated charger apparatus and a charge-receiving device in accordance with one or more implementations.
Figure 2B:
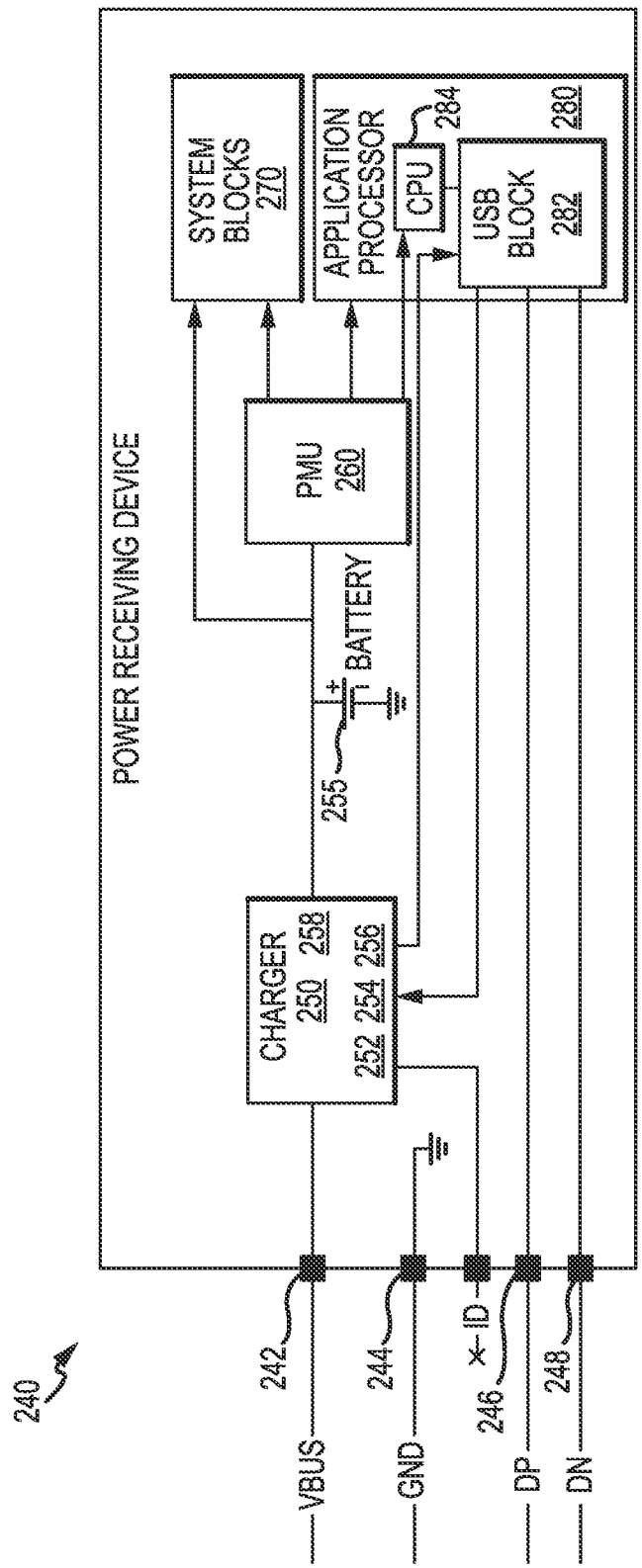

FIGS. 2A-2B illustrate examples of a smart voltage dedicated charger apparatus 210 and a charge-receiving device 240 in accordance with one or more implementations of the subject technology. The smart voltage dedicated charger apparatus (hereinafter "charger") 210 includes a first rectifier circuit 212, a transformer 216, a second rectifier circuit 218, a flyback circuit 214, a flyback controller 220, and a controller block (e.g., a smart adaptor controller) 230. The first rectifier circuit 212 rectifies input AC voltage (e.g., 220V or 120V) and converts it into a first DC voltage (e.g., 220V or 120V). The voltage applied to the primary winding of the transformer 216 is controlled (e.g., switched and varied) by the flyback circuit 214. The second rectifier circuit 218 formed by a diode D and a capacitor C1 provides the DC output voltage at ports 222 and 224 of the charger 210 that are connected, respectively, to VBUS and GND terminals of a USB cable. The default value for the DC output voltage of the charger 210 is ~5V.

In one or more implementations, the flyback circuit 214 can regulate the DC output voltage by changing the voltage of the primary winding of the transformer 216. The flyback circuit 214 is controlled by the flyback controller circuit 220, which operates to control the transistor T1 of the flyback circuit 214 in response to commands received from the controller block 230. The controller block 230 monitors ports 226 and 228 which can be connected, respectively, to the DP and DN terminals of the USB cable. In one or more implementations, the controller block 230 can be implemented in hardware, firmware, or software, which can be stored in a local memory and be executed by a local processor. In some implementations, the controller block 230 includes a monitor circuit 232, a transceiver circuit 234, a control circuit 236, and a processor 238. The monitor circuit 232 monitors the ports 226 and 228 (e.g., coupled to DP and DN terminals of the USB cable). The transceiver circuit 234 can receive one or more messages form the device 240 (e.g., the charge receiving device) and can communicate data to the device 240. The control circuit 236 controls operation of the fly back controller 220, which in turn controls the flyback circuit 214 to regulate the DC output voltage. The control circuit 236 controls operation of the fly back controller 220 based on signals received from the monitor circuit 232 and the messages received by the transceiver circuit 234 from the device 240. The processor can execute an algorithm for controlling the operation of the charger 210, as discussed in more detail herein.

The device 240, as shown in FIG. 2B, includes a charger 250, a power management unit (PMU) 260, system blocks 270, and application processor 280. The charger 250 is similar to the battery charger 142 of FIG. 1 and uses the DC input voltage provided at input ports 242 and 244 of the device 240 to provide a required level of voltage, at an output node 258, to the battery 255, the PMU 260 and the system blocks 270. The input ports 242 and 244 are connected to terminals VBUS and GND of a USB cable, when the device 240 is connected to the USB cable. The charger 250 further includes an ID-detect node 252, a current limit node 254, and a low dropout (LDO) output 256. The ID-detect node 252 is connected to an ID-port of the device 240 which is not used in the current disclosure. The PMU 260 is a known block and is tasked with an efficient distribution of electrical power within various components and modules for the device 240 such as system blocks 270 and application processor 280.

The application processor 280 supports and services various applications running on the device 240 and includes, among other modules and blocks, a central processor unit (CPU) 284 and a USB block 282. The CPU 284 can be a general-purpose processor such as a multi-core processor, a dedicated processor, or any other type of processor that is capable of executing instructions and/or configuring various components of the device 240. The USB block 282 supports a USB battery charging (BC) 1.2 detection scheme and includes a universal asynchronous receiver/transmitter (UART). The USB block 282 performs a BC1.2 detection, and once a dedicated charger port (DCP) is detected, UART messaging to the DP/DN terminals (connected to ports 246 and 248) starts. The UART messages sent by the USB block 282 are interpreted by controller block 230 of FIG. 2A and used to control and regulate the DC output voltage of the charger 210.

The USB block 282 can communicate with the charger circuit 250 through the current limit node 254 and the LDO output 256. For example, the USB block 282 can send current limit control signals to the current limit node 254 to cause the charger circuit change the current level at the output node 258 based on information received (e.g., output voltage) from the charger 210. The LDO output 256 can provide the USB block 282 with the output voltage of the charger circuit 250, so that the USB block 282 can send commands to regulate the DC output voltage of the charger 210 if necessary.

Figure 3A:
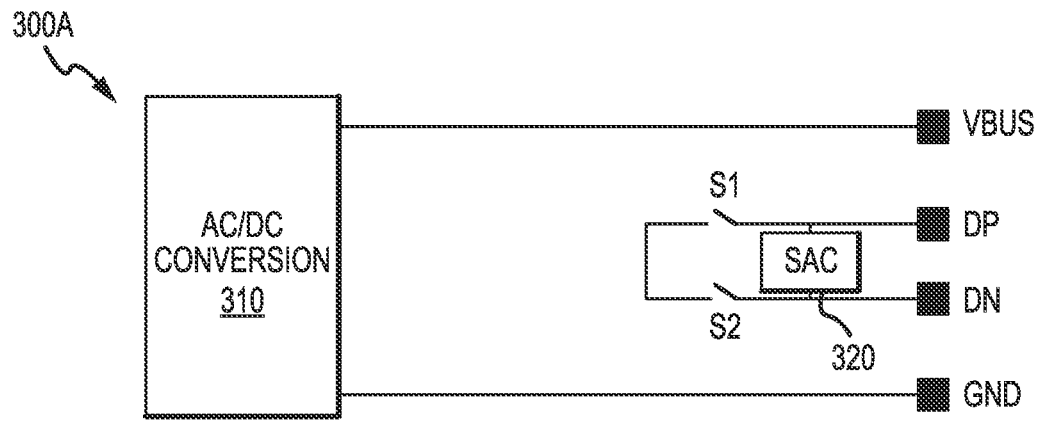
FIGS. 3A through 3C illustrate examples of a smart voltage dedicated charger apparatus in accordance with one or more implementations.
Figure 3B:
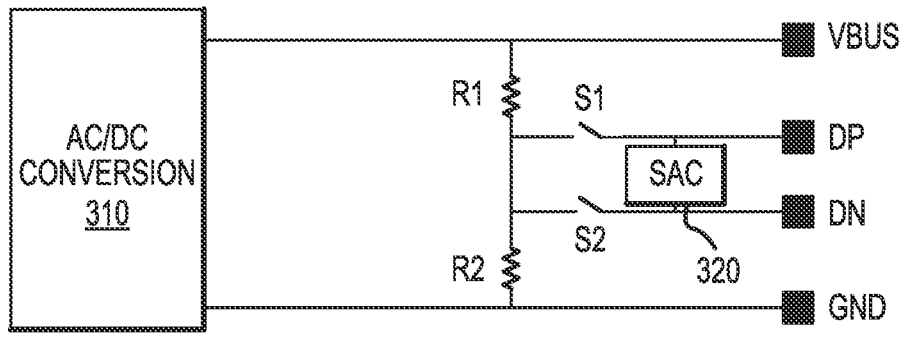
Figure 3C:
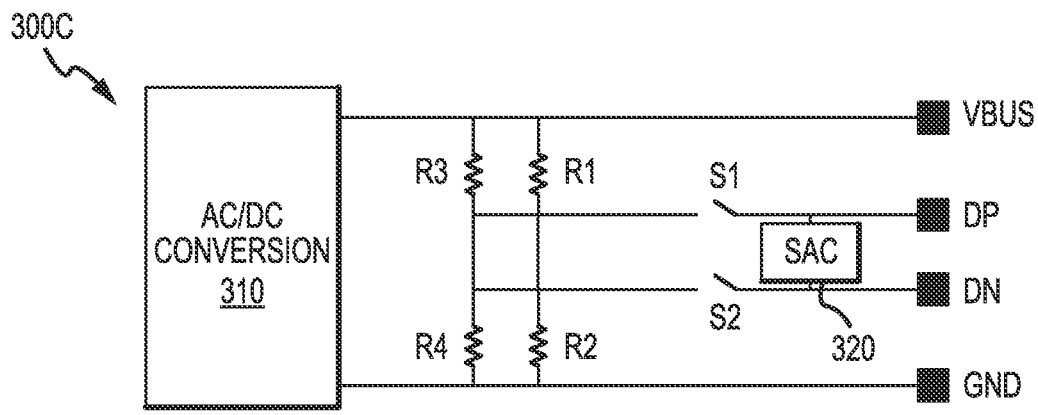

FIGS. 3A through 3C illustrate examples of a voltage dedicated charger apparatus 300A through 300C in accordance with one or more implementations of the subject technology. The USB standard defines requirements of a USB wall adaptor. However, various device manufactures have introduced modifications and used different implementations to achieve the current and voltage required for charging their manufactured devices such as mobile communication devices. The subject technology provides solutions for different implementation of the USB adaptors (e.g., chargers). For example, the voltage dedicated charger apparatus (hereinafter "charger") 300A of FIG. 3A modifies the original version, including an AC to DC converter circuit 310 and having DP and DN terminals internally shorted together, by addition of a pair of switches S1 and S2 and a controller block (e.g., a smart adaptor controller (SAC)) 320.

The AC-to-DC converter circuit 310 converts an AC input voltage (e.g., from a 220V or 110V line) to a DC output voltage (e.g., 5V). The pair of switches S1 and S2 are operable to isolate terminals (e.g., data ports) DP and DN from an internal circuit. The SAC 320 is similar to the controller block 230 of FIG. 2A and includes a monitor circuit (e.g., 232 of FIG. 2A), a transceiver (e.g., 234 of FIG. 2A), and a control circuit (e.g., 236 of FIG. 2A). The monitor circuit monitors the DP and DN ports of the apparatus. The transceiver can receive one or more messages form a charge-receiving device (e.g., 240 of FIG. 2B) and can communicate data to the charge-receiving device. The control circuit controls operation of the pair of switches S1 and S2 based on a signal from the monitor circuit. The internal circuit, for the charger 300A (e.g., a 1 A or 1.5 A charger) is a short circuit that when detected by the charge-receiving device indicates a legacy mode, in which the voltage across the terminals VBUS and GND is expected to be the standard USB output voltage (e.g., 5V). In one or more implementations, the pair of switches are closed by default, and the AC-to-DC converter circuit provides a default DC output voltage (e.g., approximately 5 Volts) during the period that the pair of switches are closed.

In the charger 300B (e.g., 2 A charger) of FIG. 3B, the internal circuit includes resistors R1 and R2 coupling the short circuit between the terminals DP and DN to the terminals VBUS and GND. In some implementations, the resistors R1 and R2 are chosen such that by default (e.g., when switches S1 and S2 are closed) the voltage at the terminals DP and DN is ~1.25 V. This voltage at terminals DP and DN of the charger 300B, when sensed by the charge-receiving device (e.g., 240) coupled via a USB cable to the charger 300B, identifies the charger 300B as a 2 A charger.

In the charger 300C (e.g., 1 A or 2 A charger) of FIG. 3B, the internal circuit includes a resistor ladder formed by resistors R1, R2, R3, and R4. The resistors R1 and R2 are coupled between the terminal DN and the ports VBUS and GND of the charger, respectively. The resistors R3 and R4 are coupled between the terminal DP and the ports VBUS and GND of the charger, respectively. In some implementations, the resistors R1, R2, R3 and R4 of the resistor ladder are chosen such that by default (e.g., when switches S1 and S2 are closed) the voltages at the terminals DP and DN are within ~2V to ~2.8V. These voltages at terminals DP and DN of the charger 300C, when sensed by the charge-receiving device (e.g., 240) coupled via a USB cable to the charger 300C, identifies the charger 300C as a 1 A or 2 A charger.

In one or more implementations of the subject technology, the SAC 320 can enable adjustment of the DC output voltages of the charger (e.g., 300A, 300B, or 300C) based on messages received from the charge receiving device. For example, after identifying the charger (e.g., when the switches S1 and S2 are closed) the charge-receiving device sends a first ping through one of the DP or DN terminals of the USB cable to the charger. The monitor circuit of the SAC 320, upon detection of the first ping from one of the DP or DN terminals of the USB cable coupled to the charger, causes the control circuit to open the pair of switches. When the charge receiver device detects an open circuit between the DP or DN terminals of the USB cable, send a second ping to the charger through the DP or DN terminals of the USB cable. Upon detection of the second ping at one of the DP or DN terminals of the charger within a predetermined time period (e.g., approximately 100 milliseconds), the monitor circuit causes the transceiver of the SAC 320 to communicate an acknowledgement (ACK) signal to the charge receiving device, and can cause the transceiver to receive and interpret one or more messages from the charge receiving device.

In some implementations, the messages include commands such as get voltage, get current, lower the DC output voltage by one step, raise the DC output voltage by one step, or other commands. For example, the get voltage or get current commands when received by transceiver causes the SAC 320 to provide the current values of the output voltage or the output current of the charger, respectively, to the charge-receiving device through the DP or DN terminals of the USB cable. In some aspects, the data communicated to the charge-receiving device includes a DC output voltage, a minimum DC output voltage, a maximum DC output voltage, a voltage step size, and current-voltage knee-points for various voltage ranges of the DC output voltage. In some implementations, the SAC 320 can enable adjustment of the DC output voltage at terminal VBUS and GND of the charger based on the interpreted one or more messages from the charge receiving device. For example, in response to commands such as the lower the DC output voltage by one step and raise the DC output voltage by one step commands, the SAC 320 can regulate the DC output voltage of the charger accordingly, as described above with respect to FIG. 2A.

FIGS. 4A-4B are a flow diagram 400A and a corresponding time diagram 400B illustrating an example of an operation of a smart voltage dedicated charger apparatus in accordance with one or more implementations of the subject technology. The operation of a smart voltage dedicated charger apparatus (hereinafter "charger") (e.g., 200A of FIG. 2A) begins at an operation block 402, where the charger is connected to the AC line (e.g., 220V or 110V) and power is received by the charger and the charger provides ~5V at the VBUS port. An operation block 404 corresponds to the legacy mode of the charger with VBUS=~5V and DP and DN terminals are shorted together. At a decision block 406, the monitor circuit 232 of FIG. 2A checks to see if a first ping (e.g., a UART ping) has arrived at one of the DP or DN ports of the charger (e.g., 210 of FIG. 2A). If no ping is detected the control is transferred to the operation block 404 and the charger continues to operate in the legacy mode. However, if the first ping is detected, at an operation block 408, the switches S1 and S2 (e.g., of FIGS. 3A through 3C) are disconnected. At a decision block 410, the monitor circuit 232 of FIG. 2A checks to see if a second ping has arrived at one of the DP or DN ports of the charger within a predetermined time period (e.g., approximately 100 milliseconds). If no ping is detected the control is transferred to the operation block 404 and the charger continues to operate in the legacy mode. Otherwise, at an operation block 412, a reply is sent by the transceiver circuit 234 of FIG. 2A to the charge receiving device. The reply includes a ping-ACK packet that is sent through the DP or DN terminals of the USB cable. A portion 420 of the flow diagram 400A is a smart charge phase, where at an operation block 422, one or more Vset commands (e.g., lower the DC output voltage by one step and raise the DC output voltage by one step) are accepted and the output voltage of the charger at the port VBUS is changed based on the command. At a decision block 424, the monitor circuit 232 monitors the (e.g., every 100 msec) to see if the DP or DN ports for UART packets, and if no packet is received the control is passed to the operation block 404, otherwise the control is passed to the operation block 422. The operations of the flow diagram 400A can be executed by a processor, for example, embedded in the smart adaptor controller 230 of FIG. 2A such as the processor 238 of FIG. 2A.

The time diagram 400B of FIG. 4B shows that during a time period T1, the charger (e.g., adaptor) is off. During a time period T2, before arrival of the first UART ping, the charger is in legacy mode and VBUS is ~5V. During a time period T3, when the charger responds to the first UART ping, and during a time period T4 the VBUS is still ~5V.

During a time period T5, which coincides with the smart charge phase, the voltage at VBUS is variable.

Figure 5:
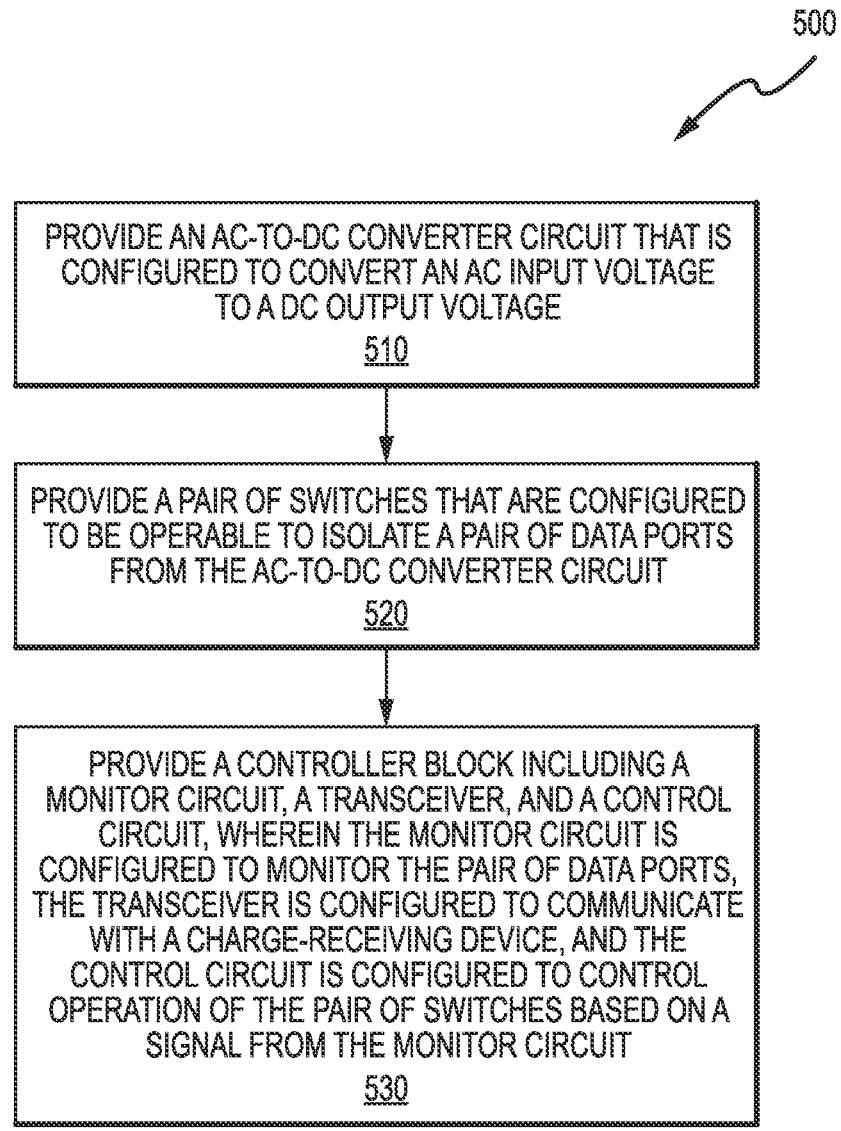
FIG. 5 illustrates an example of a method for providing a smart voltage dedicated charger apparatus in accordance with one or more implementations.

FIG. 5 illustrates an example of a method 500 for providing a voltage dedicated charger apparatus in accordance with one or more implementations of the subject technology. For explanatory purposes, the blocks of the example method 500 are described herein as occurring in serial, or linearly. However, multiple blocks of the example method 500 can occur in parallel. In addition, the blocks of the example method 500 need not be performed in the order shown and/or one or more of the blocks of the example method 500 need not be performed.

According to the method 500, an AC-to-DC converter circuit (e.g., 112 of FIG. 1 or 310 of FIG. 3A) is provided that converts an AC input voltage (e.g., at ports 102 and 104 of FIG. 1) to a DC output voltage (e.g., at ports 122 and 124 of FIG. 1 or VBUS and GND of FIG. 3A) (510). A pair of switches (e.g., S1 and S2 of FIG. 3A) are provided that are operable to isolate a pair of data ports (e.g., DP and DN of FIG. 3A) from an internal circuit (e.g., R1 and R2 of FIG. 3B)(520). A controller block (e.g., 320 of FIG. 3A) is provided that includes a monitor circuit (e.g., 232 of FIG. 2A), a transceiver (e.g., 234 of FIG. 2A), and a control circuit (e.g., 236 of FIG. 2A) (530). The monitor circuit can monitor the pair of data ports, the transceiver can communicate with a charge-receiving device (e.g., 240 of FIG. 2B), and the control circuit can control operation of the pair of switches based on a signal from the monitor circuit.

Figure 6:
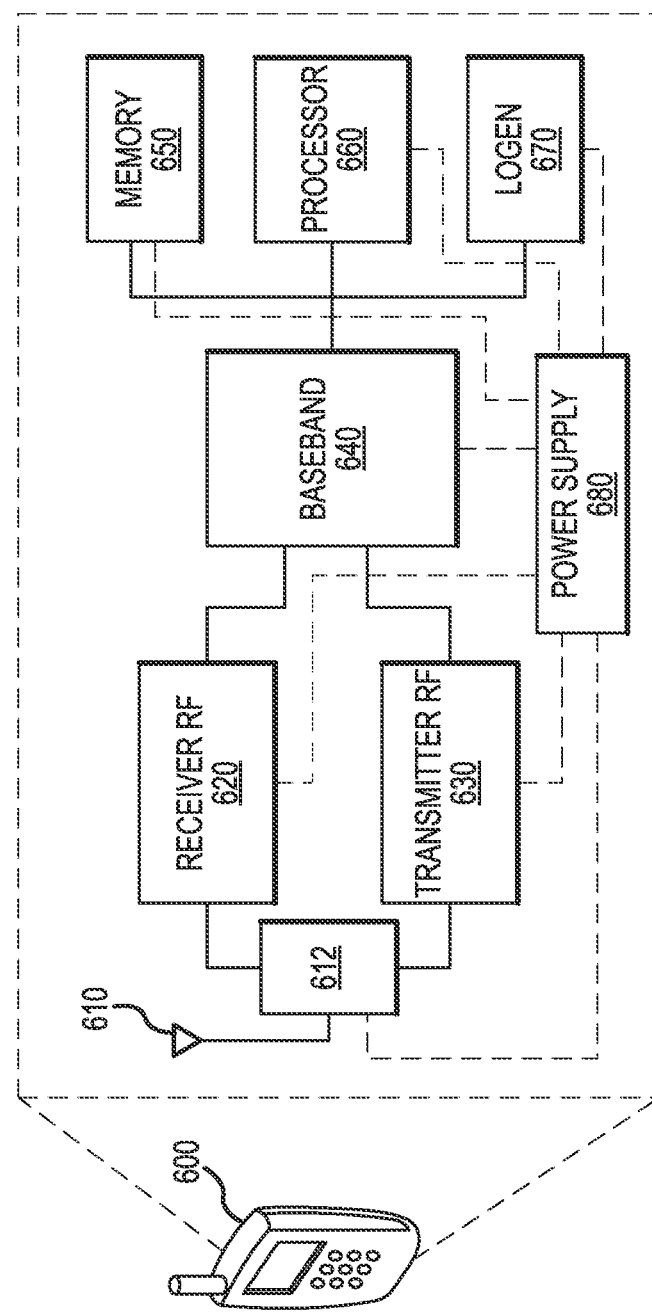
FIG. 6 illustrates an example of a wireless communication device employing features of the subject technology in accordance with one or more implementations.

FIG. 6 illustrates an example of a wireless communication device employing features of the subject technology in accordance with one or more implementations of the subject technology. The wireless communication device 600 includes a radio-frequency (RF) antenna 610, a receiver 620, a transmitter 630, a baseband processing module 640, a memory 650, a processor 660, a local oscillator generator (LOGEN) 670, a power supply 680 and a sensor module 590. In various embodiments of the subject technology, one or more of the blocks represented in FIG. 6 can be integrated on one or more semiconductor substrates. For example, the blocks 620-670 can be realized in a single chip or a single system on chip, or can be realized in a multi-chip chipset.

The RF antenna 610 can be suitable for transmitting and/or receiving RF signals (e.g., wireless signals) over a wide range of frequencies. Although a single RF antenna 610 is illustrated, the subject technology is not so limited.

The receiver 620 comprises suitable logic circuitry and/or code that can be operable to receive and process signals from the RF antenna 610. The receiver 620 can, for example, be operable to amplify and/or down-convert received wireless signals. In various embodiments of the subject technology, the receiver 620 is operable to cancel noise in received signals and can be linear over a wide range of frequencies. In this manner, the receiver 620 is suitable for receiving signals in accordance with a variety of wireless standards. Wi-Fi, WiMAX, Bluetooth, and various cellular standards.

The transmitter 630 comprises suitable logic circuitry and/or code that can be operable to process and transmit signals from the RF antenna 610. The transmitter 630 can, for example, be operable to up-convert baseband signals to RF signals and amplify RF signals. In various embodiments of the subject technology, the transmitter 630 is operable to up-convert and to amplify baseband signals processed in accordance with a variety of wireless standards. Examples of such standards include Wi-Fi, WiMAX, Bluetooth, and various cellular standards. In various embodiments of the subject technology, the transmitter 630 is operable to provide signals for further amplification by one or more power amplifiers.

The duplexer 612 provides isolation in the transmit band to avoid saturation of the receiver 620 or damaging parts of the receiver 620, and to relax one or more design requirements of the receiver 620. Furthermore, the duplexer 612 can attenuate the noise in the receive band. The duplexer is operable in multiple frequency bands of various wireless standards.

The baseband processing module 640 comprises suitable logic, circuitry, interfaces, and/or code that can be operable to perform processing of baseband signals. The baseband processing module 640 can, for example, analyze received signals and generate control and/or feedback signals for configuring various components of the wireless communication device 600 such as the receiver 620. The baseband processing module 640 is operable to encode, decode, transcode, modulate, demodulate, encrypt, decrypt, scramble, descramble, and/or otherwise process data in accordance with one or more wireless standards.

The processor 660 comprises suitable logic, circuitry, and/or code that can enable processing data and/or controlling operations of the wireless communication device 600. In this regard, the processor 660 is enabled to provide control signals to various other portions of the wireless communication device 600. The processor 660 can also control transfers of data between various portions of the wireless communication device 600. Additionally, the processor 660 can enable implementation of an operating system or otherwise execute code to manage operations of the wireless communication device 600.

The memory 650 comprises suitable logic, circuitry, and/or code that can enable storage of various types of information such as received data, generated data, code, and/or configuration information. The memory 650 includes, for example, RAM, ROM, flash, and/or magnetic storage. In various embodiment of the subject technology, the memory 650 can include a RAM, DRAM, SRAM, T-RAM, Z-RAM, TTRAM, or any other storage media.

The LOGEN 670 comprises suitable logic, circuitry, interfaces, and/or code that can be operable to generate one or more oscillating signals of one or more frequencies. The LOGEN 670 can be operable to generate digital and/or analog signals. In this manner, the LOGEN 670 can be operable to generate one or more clock signals and/or sinusoidal signals. Characteristics of the oscillating signals such as the frequency and duty cycle can be determined based on one or more control signals from, for example, the processor 660 and/or the baseband processing module 640.

In operation, the processor 660 can configure the various components of the wireless communication device 600 based on a wireless standard according to which it is desired to receive signals. Wireless signals can be received via the RF antenna 610 and amplified and down-converted by the receiver 620. The baseband processing module 640 can perform noise estimation and/or noise cancellation, decoding, and/or demodulation of the baseband signals. In this manner, information in the received signal can be recovered and utilized appropriately. For example, the information can be audio and/or video to be presented to a user of the wireless communication device, data to be stored to the memory 650, and/or information affecting and/or enabling operation of the wireless communication device 600. The baseband processing module 640 can modulate, encode and perform other processing on audio, video, and/or control signals to be transmitted by the transmitter 630 in accordance to various wireless standards.

In some implementations, the processor 660 performs the functionalities of the CPU 284 of FIG. 2B, and the receiver 620 and transmitter 630 perform the functionalities of the UART of the USB block 282 of FIG. 2B. In one or more implementations of the subject technology, the power supply 680 can, for example, use the smart charger (e.g., 210 of FIG. 2A or any of the chargers of FIGS. 3A through 3C) to charge its batteries and provide power to various circuitry of the communication device 600, when its batteries are not charged or even depleted.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A smart voltage dedicated charger apparatus, the apparatus comprising:
    an AC-to-DC converter circuit configured to convert an AC input voltage to a DC output voltage;
    a pair of switches configured to be operable to isolate a pair of data ports from an internal circuit, the pair of data ports including a DP port and a DN port; and
    a controller block comprising:
        a monitor circuit configured to monitor the DP and DN ports of the apparatus;
        a transceiver configured to receive one or more messages from a charge-receiving device and to communicate data to the charge-receiving device; and
        a control circuit configured to control operation of the pair of switches based on a signal from the monitor circuit.

2. The apparatus of claim 1, wherein the internal circuit comprises a short circuit or a resistor circuit, wherein the resistor circuit is coupled to output ports of the AC-to-DC converter circuit.

3. The apparatus of claim 1, wherein the pair of switches are closed by default, and wherein the AC-to-DC converter circuit is configured to provide a default DC output voltage during a period that the pair of switches are closed, and wherein the default DC output voltage comprises approximately 5 Volts.

4. The apparatus of claim 1, wherein the control circuit is further configured to enable adjustment of the DC output voltage based on the one or more messages received from the charge receiving device.

5. The apparatus of claim 4, wherein the monitor circuit is configured to detect a first ping from one of the DP and DN ports and, in response to detecting the first ping, to cause the control circuit to open the pair of switches.

6. The apparatus of claim 1, wherein the monitor circuit is further configured to detect a ping from one of the DP and DN ports within a predetermined time period, wherein the predetermined time period comprises approximately 100 milliseconds, and wherein in response to detecting the ping, the monitor circuit is configured to cause the transceiver to communicate an acknowledgement (ACK) signal to the charge receiving device, and to cause the transceiver to receive and interpret the one or more messages from the charge receiving device.

7. The apparatus of claim 6, wherein the control circuit is configured to enable adjustment of the DC output voltage based on the interpreted one or more messages from the charge receiving device.

8. The apparatus of claim 1, wherein the data communicated to the charge-receiving device comprises a DC output voltage, a minimum DC output voltage, a maximum DC output voltage, a voltage step size, and current-voltage knee-points for various voltage ranges of the DC output voltage.

9. The apparatus of claim 1, wherein the one or more messages comprise commands including, get voltage, get current, lower the DC output voltage by one step, and raise the DC output voltage by one step.

10. A method for providing a smart voltage dedicated charger apparatus, the method comprising:
   providing an AC-to-DC converter circuit that is configured to convert an AC input voltage to a DC output voltage;
   providing a pair of switches that are configured to be operable to isolate a pair of data ports from an internal circuit; and
   providing a controller block comprising a monitor circuit, a transceiver, and a control circuit,
   wherein:
      the monitor circuit is configured to monitor the pair of data ports;
      the transceiver is configured to communicate with a charge-receiving device; and
      the control circuit is configured to control operation of the pair of switches based on a signal from the monitor circuit.

11. The method of claim 10, wherein the pair of switches are closed by default, and wherein the method comprises configuring the AC-to-DC converter circuit to provide a default DC output voltage during a period that the pair of switches are closed, and wherein the default DC output voltage comprises approximately 5 Volts.

12. The method of claim 10, further comprising configuring the control circuit to enable adjustment of the DC output voltage based on one or more messages received from the charge receiving device.

13. The method of claim 10, wherein the pair of data ports include a DP port and a DN port, and the method further comprises configuring the monitor circuit to detect a first ping from one of the pair of data ports and, in response to detecting the first ping, to cause the control circuit to open the pair of switches.

14. The method of claim 10, further comprising configuring the monitor circuit to detect a ping from one of the pair of data ports within a predetermined time period, and wherein the predetermined time period comprises approximately 100 milliseconds.

15. The method of claim 14, further comprising configuring the monitor circuit to cause the transceiver, in response to detecting the ping, to communicate an acknowledgement (ACK) signal to the charge receiving device, and to cause the transceiver to receive and interpret one or more messages from the charge receiving device.

16. The method of claim 15, further comprising configuring the control circuit to enable adjustment of the DC output voltage based on the interpreted one or more messages from the charge receiving device.

17. The method of claim 10, wherein communicating with the charge-receiving device comprises receiving one or more messages form the charge-receiving device and communicating data to the charge-receiving device, wherein the data communicated to the charge-receiving device comprises a DC output voltage, a minimum DC output voltage, a maximum DC output voltage, a voltage step size, and current-voltage knee-points for various voltage ranges of the DC output voltage.

18. The method of claim 17, wherein the one or more messages comprise commands including, get voltage, get current, lower the DC output voltage by one step, and raise the DC output voltage by one step.

19. A system comprising:
   an adaptor device; and
   a charge-receiving device comprising a charger circuit and an application processor,
   wherein:
   the charger circuit is configured to receive a DC voltage from the adaptor device,
   the application processor is configured to communicate with the adaptor device, and
   the adaptor device comprises:
      an AC-to-DC converter circuit configured to convert an AC input voltage to the DC voltage;
      a pair of switches configured to be operable to isolate a pair of data ports from an internal circuit,
      a controller block comprising:
         a monitor circuit configured to monitor the pair of data ports of the adaptor device;
         a transceiver configured to receive one or more messages from the application processor and to communicate data to the application processor; and
         a control circuit configured to control operation of the pair of switches based on a signal from the monitor circuit.

20. The system of claim 19, wherein:
   the internal circuit comprises a short circuit or a resistor circuit,
   the resistor circuit is coupled to output ports of the AC-to-DC converter circuit,
   the pair of switches are closed by default,
   the AC-to-DC converter circuit is configured to provide a default DC output voltage during a period that the pair of switches are closed, and
   the control circuit is further configured to enable adjustment of the DC output voltage based on the one or more messages received from the charge receiving device.

* * * * *